UNITED STATES PATENT OFFICE.

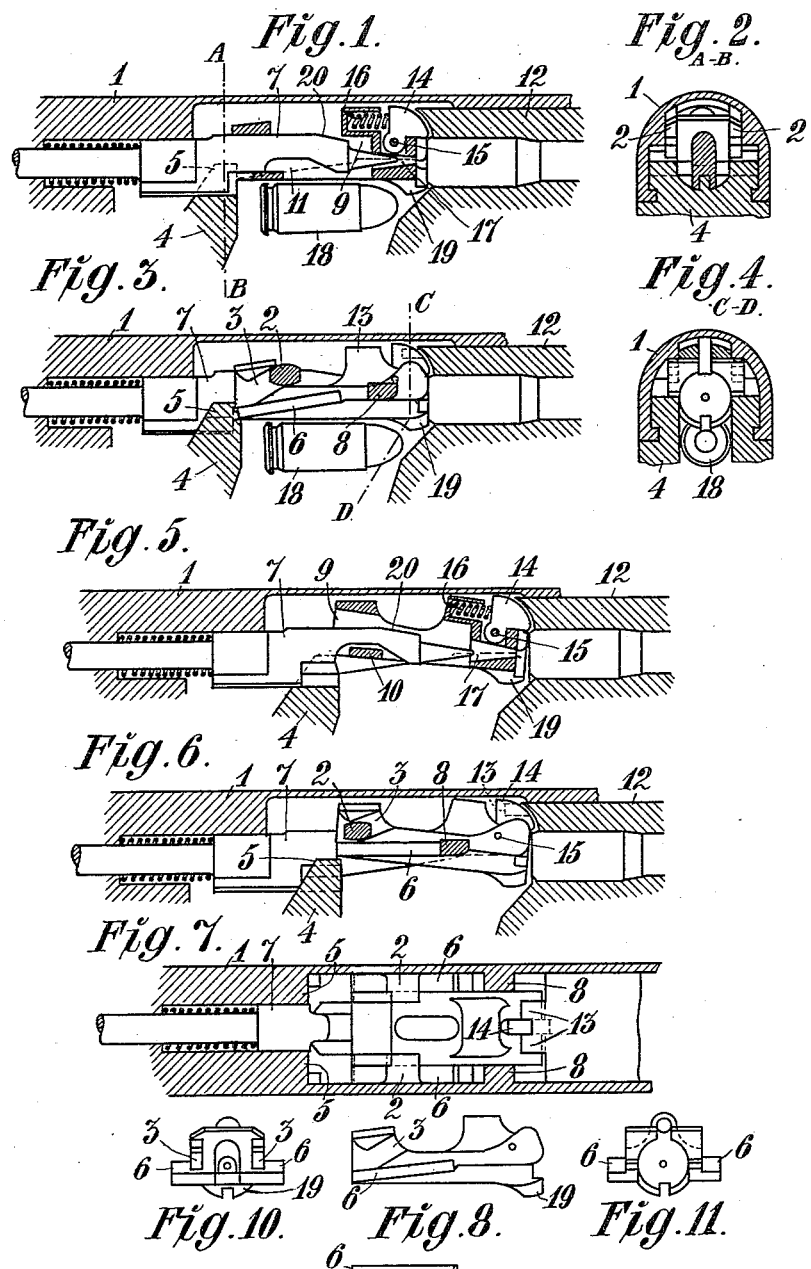

CARL AXEL THEODOR SJÖGREN, OF STOCKHOLM, SWEDEN, ASSIGNOR TO AKTIEBO-LAGET SVENSKA VAPEN- OCH AMMUNITIONSFABRIKEN, OF STOCKHOLM, SWEDEN, A COMPANY OF SWEDEN.

FIREARM.

1,021,381. Specification of Letters Patent. Patented Mar. 26, 1912.

Application filed May 26, 1911. Serial No. 629,741.

*To all whom it may concern:*

Be it known that I, CARL AXEL THEODOR SJÖGREN, a subject of the King of Sweden, residing at Stockholm, in the Kingdom of Sweden, have invented new and useful Improvements in Firearms, of which the following is a specification, reference being had to the drawing accompanying and forming a part hereof.

In certain fire-arms previously constructed the breech bolt is adapted to swing about its front end, when the mechanism is to be opened, so that a shoulder or the like on the breech bolt is brought out of engagement with a fixed abutment normally retaining the breech bolt in closed position. In fire-arms of this kind the breech bolt was, however, operable by hand only, and after each firing it was brought by hand out of and into its closing position.

The object of this invention is to provide a fire-arm of the said kind in which the breech bolt is operated entirely automatically, and the invention consists, chiefly, in the combination with a breech bolt movable in the manner set forth, of a weight movable under the action of the recoil and acting to swing the said breech bolt out of engagement with the abutment, when firing takes place.

The invention further comprises the construction and combination of parts hereinafter set forth.

In the drawing, I have shown a breech bolt mechanism embodying the invention.

Figure 1 is a longitudinal section of part of the mechanism, the breech bolt being shown in section in its closed position. Fig. 2 is a cross-section on line A—B of Fig. 1. Fig. 3 is a view similar to Fig. 1, but with the breech bolt shown in elevation. Fig. 4 is a cross-section on line C—D in Fig. 3. Figs. 5 and 6 are views similar to Figs. 1 and 3, respectively, but with the breech bolt shown in the oblique position which it takes up immediately before it is moved backward. Fig. 7 is a plan view partly in section, of the mechanism. Fig. 8 is a side view, Fig. 9 is a plan view, and Figs. 10 and 11 are rear and front end views, respectively, of the breech bolt detached.

Referring to the drawing, 1 is a part of the mechanism operated by the recoil, hereinafter referred to as a weight, said part being preferably formed of a cap inclosing the breech bolt mechanism. Projecting from the inner sides of the said weight are two lugs 2 fitting in obliquely extending lateral grooves 3 in the breech bolt. The front ends of the grooves 3 are at a higher level than the rear ones, so that the rear end of the breech bolt will be raised, when the weight moves backward. When the breech bolt is in its closing position (Figs. 1 and 3), two shoulders 6 on the sides of the breech bolt bear with their rear ends on abutments 5 on the fixed frame 4. When the weight 1 moves backward, due to the recoil, the lugs 2 act on the upper edges of the grooves 3 so as to raise the rear end of the breech bolt, causing the rear ends of the shoulders 6 to be disengaged from the abutments 5, and during the continued backward movement of the weight 1 the breech bolt is thus free to move backward.

If the rear ends of the grooves 3 were closed, the backward movement of the breech bolt might be effected by the lugs 2. As it is, however, desired to make it possible to take the mechanism into pieces and mount it for use, without first removing the pin or striker 7, the grooves 3 should be open at their rear ends, so as to allow the breech bolt to be removed forwardly and reinserted. The backward movement of the breech bolt disengaged from the abutments 5 is, therefore, effected by two other lugs 8 projecting inwardly from the weight 1. When the breech bolt is in its closing position, as shown in Fig. 3, the lugs 8 are at a distance in front of the forward ends of the shoulders 6 equal to the distance through which the lugs 2 are moving for disengaging the breech bolt. Just when the breech bolt has been disengaged, the lugs 8 have arrived into contact with the forward ends of the shoulders 6, ready to push the breech bolt backward.

The striker 7 is placed in a cavity 9 (Figs. 1 and 5) in the breech bolt. Extending across the said cavity is a bridge piece 10. When the rear end of the breech bolt is swung upward, the bridge piece 10 enters into a recess 11 at the lower side of the striker, provided the latter is in cocked position.

If for any reason the breech bolt is not in closed positon, when firing is to take place, the bridge piece 10 acts to prevent the striker from moving forward, and on account thereof firing cannot take place unless the breech bolt takes up its proper closing position.

In order to allow the breech bolt to be placed around about the striker, the forward edge of the recess 11 is obliquely cut, as clearly shown in Figs. 1 and 5, and for the same purpose the striker head is obliquely cut at its upper side, as shown at 20.

Projecting rearwardly from the barrel 12 is a shoulder 13 serving as an upper support for the forward end of the breech bolt, when the rear end thereof is swung upward. Extending into a central recess in the said shoulder is the cartridge-ejector 14, which is pivoted on a pin 15 in the breech bolt and pressed forward by a spring 16.

The length of the striker 7 is such that, when the striker is cocked, its point extends somewhat into the conical striker opening 17 of the breech bolt, whether the latter is in closed or in retracted position. By this arrangement the breech bolt is prevented from sinking with its forward end past the striker, and the point of the latter thus acts as a locking part for the breech bolt and the striker. When the breech bolt is to be detached, the striker must therefore be retracted by hand into a position in which the point is free to swing past the striker opening.

In order to cause the breech bolt to take up its proper position, when the mechanism is closed, it is of importance that the downward swinging of the breech bolt is not prevented by the uppermost cartridge in the magazine. This cartridge should therefore be kept at some distance from the underside of the breech bolt in its closing position, which may be effected in any well-known manner, for instance by a spring (not shown) placed in one wall of the magazine and having a hook or the like projecting above the cartridge. Nevertheless, when the breech bolt moves forward, its front end must push the uppermost cartridge before it into the chamber. Inasmuch as the uppermost cartridge is retained in the manner set forth, it cannot be advanced unless some part at the forward end of the breech bolt arrives below the upper edge of the cartridge, when the breech bolt is in retracted position. Such a part 19 is provided at the lower side of the front end of the breech bolt. When the breech bolt moves backward, the part 19 slides on the uppermost cartridge pressing the same somewhat downward, and when the shoulder 19 has arrived behind the rear end of the cartridge, the latter again rises so that, when the breech bolt moves forward, the shoulder 19 strikes the rear end of the cartridge and advances it. If desired, the shoulder 19 may be resilient, in which case the uppermost cartridge need not be depressed, when the breech bolt moves backward.

I claim:

1. In a fire-arm, the combination of a breech bolt adapted to swing about its forward end, rear abutments for the said breech bolt for locking the same in its closing position, and a weight movable under the action of the recoil and acting to swing the said breech bolt out of engagement with the said abutments, when firing takes place.

2. In a fire-arm, the combination of a breech bolt adapted to swing about its forward end, rear abutments for the said breech bolt for locking the same in its closing position, and a part having lugs engaging obliquely extending lateral grooves in the breech bolt, said part being actuated when firing takes place so as to automatically disengage the breech bolt.

3. In a fire-arm, the combination of a breech bolt adapted to swing about its forward end and having obliquely extending lateral grooves and lateral shoulders, rear abutments for the said breech bolt for locking the same in its closing position, and a part which is automatically moved backward relatively to the breech bolt when firing takes place, said part having lugs engaging the grooves in the breech bolt for automatically disengaging the same and other lugs adapted to bear on the shoulders of the breech bolt, when the latter has been disengaged, so as to move the breech bolt backward.

4. In a fire-arm, the combination of a breech bolt adapted to swing about its forward end and having obliquely extending lateral grooves open at both ends, rear abutments for the said breech bolt for locking the same in its closing position, and a part which is automatically moved backward relatively to the breech bolt when firing takes place, said part having lugs engaging the grooves in the breech bolt for automatically disengaging the same.

5. In a fire-arm, the combination of a breech bolt adapted to swing about its forward end and having obliquely extending lateral grooves open at both ends and lateral shoulders, rear abutments for the said breech bolt for locking the same in its closing position, and a part which is automatically moved backward relatively to the breech bolt when firing takes place, said part having lugs engaging the grooves in the breech bolt for automatically disengaging the same and other lugs adapted to bear on the shoulders of the breech bolt, when the latter has been disengaged, so as to move the breech bolt backward.

6. In a fire-arm, the combination of a breech bolt adapted to swing about its forward end and having at the said end a conical opening, rear abutments for the said breech bolt for locking the same in its closing position, means for automatically swinging the said breech bolt out of engagement with the said abutments, when firing takes place, and a striker placed in the breech bolt and having a point extending, in any position of the breech bolt and the striker, into the conical opening of the former for retaining the parts in proper position relatively to each other.

7. In a fire-arm, the combination of a breech bolt adapted to swing about its forward end, said breech bolt having a cavity bounded at its lower part by a bridge piece, rear abutments for the said breech bolt for locking the same in its closing position, means for automatically swinging the said breech bolt out of engagement with the said abutments, when firing takes place, and a striker placed in the cavity in the breech bolt and having at its lower side a recess adapted to receive the bridge piece of the breech bolt, when the latter is swung upward, thereby causing the striker to be locked in position relatively to the breech bolt until the latter is brought back into closing position.

CARL AXEL THEODOR SJÖGREN.

Witnesses:
AUG. SÖRENSEN,
KARL RUNESKOZ.

Copies of this patent may be obtained for five cents each, by addressing the "Commissioner of Patents, Washington, D. C."